Nov. 8, 1927.
J. F. O'CONNOR
1,648,320
FRICTION SHOCK ABSORBING MECHANISM
Filed July 6, 1926
2 Sheets-Sheet 2
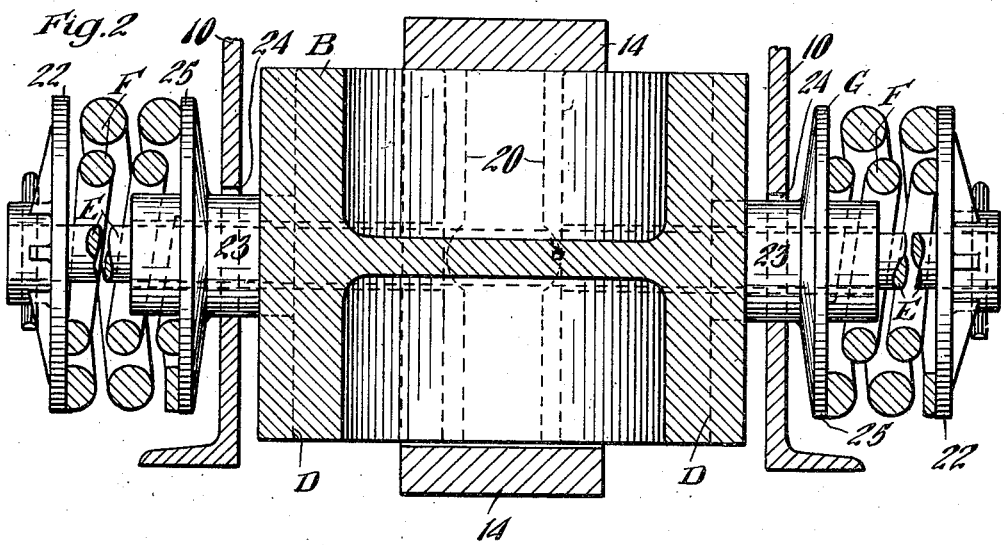
Witness
Wm. Geiger
Inventor
John F. O'Connor
By George I. Haight
His Atty.

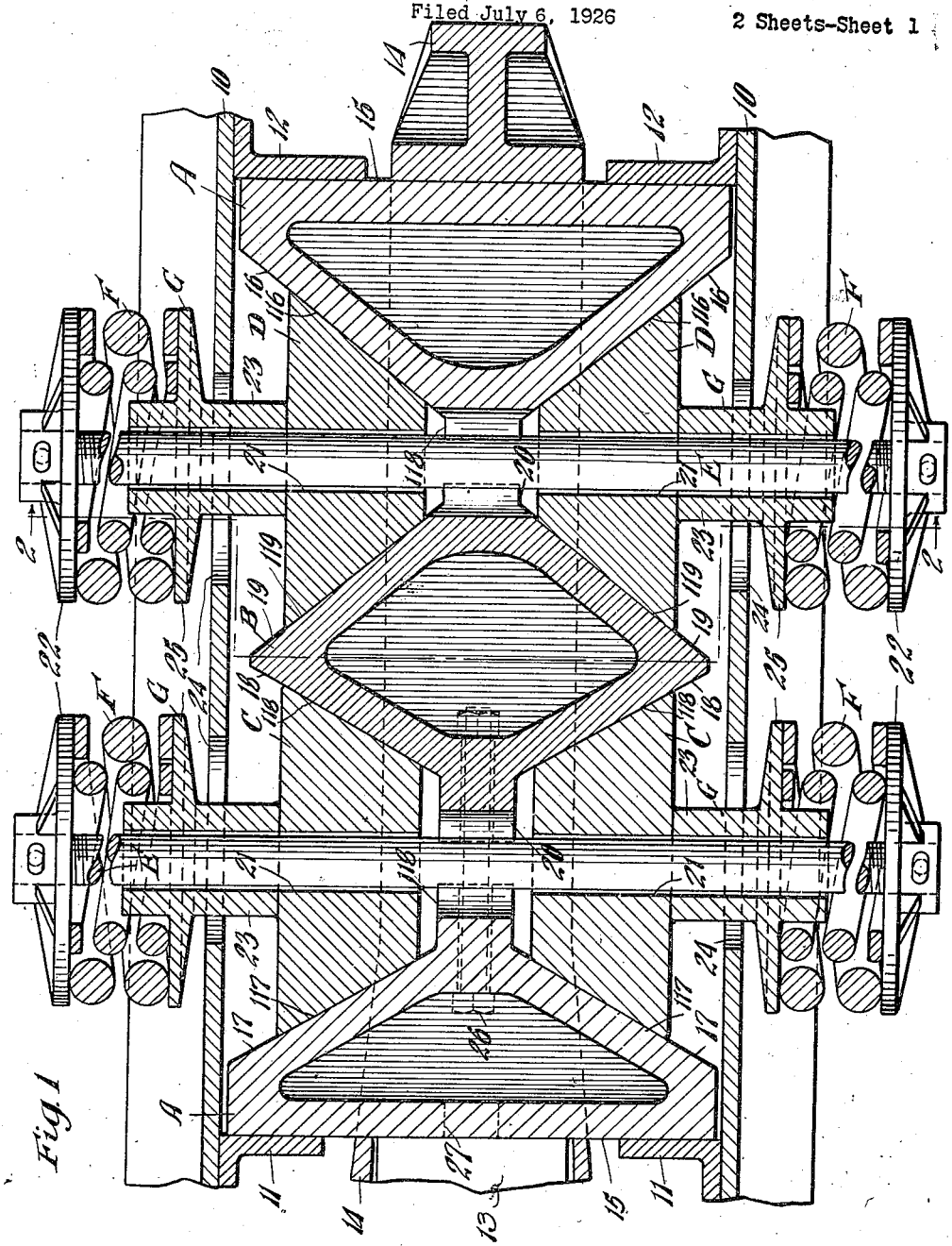

Patented Nov. 8, 1927.

1,648,320

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 6, 1926. Serial No. 120,777.

This invention relates to improvements in friction shock absorbing mechanisms.

One object of the invention is to provide a friction shock absorbing mechanism especially adapted for railway draft riggings including a plurality of friction elements having inter-engaging wedge friction surfaces of different angularity to provide for successive stages of frictional resistance of different capacities.

A further object of the invention is to provide in a friction shock absorbing mechanism, including wedge blocks and side friction members having inter-engaging wedge faces, wherein certain of the wedge blocks and side members have the inter-engaging faces disposed at a relatively keener wedge-acting angle with reference to the direction of the applied actuating force than the remaining inter-engaging faces thereof, to produce increasing resistance in two successive stages.

A still further object of the invention is to provide, in a mechanism of the character indicated, employing wedge blocks and side friction members having inter-engaging faces disposed at keener acting angles than the remaining inter-engaging wedge faces, means for limiting the relative movement of the friction members having the keen wedge faces to bring into operation the members provided with the blunter wedge faces.

A more specific object of the invention is to provide a friction shock absorbing mechanism having two sets of side friction members, keen angle wedge members co-operating with one of said sets, and blunt angle wedge members co-operating with the other set, wherein the wedge members are relatively movable with reference to each other and means is provided for limiting the relative movement of the wedge members having the keen faces after a predetermined compression of the mechanism and permit actuation of the wedge members having the blunt faces during the remainder of the compression stroke to produce augmented frictional resistance.

Other objects and advantages of the invention will more clearly appear from the description and claims hereinafter following.

In the drawings forming a part of this specification, Figure 1 is a horizontal, longitudinal, sectional view of a portion of a railway draft rigging showing my improvements in connection therewith. And Figure 2 is a transverse, vertical, sectional view corresponding substantially to the line 2—2 of Figure 1.

In said drawings, 10—10 indicate channel shaped center or draft sills of a railway car underframe to the inner faces of which are secured front stop lugs 11—11 and rear stop lugs 12—12. The inner end portion of the drawbar is designated by 13 to which is operatively connected a yoke 14 of well known form. The shock absorbing mechanism proper is operatively disposed within the yoke.

The shock absorbing mechanism proper comprises broadly, a pair of front and rear follower blocks A—A; a central wedge block B; a set of side members C—C having blunt wedge faces; a set of side members D—D having keen wedge faces; transversely extending bolts E—E; two pairs of spring resistance elements F—F; and two sets of spring followers G—G. The front and rear follower blocks A are of similar design, being in the form of hollow castings, each having a flat transversely extending end face 15 co-operating with the corresponding stop lugs on the draft sills. On the inner side, the rear follower block A is provided with a pair of wedge faces 16—16 disposed at a relatively keen angle with respect to the longitudinal axis of the mechanism. The front block A is also provided with a pair of wedge faces 17 on the inner side thereof, the same being disposed at a relatively blunt angle with respect to the longitudinal axis of the mechanism. Each of the blocks A is also provided with an inwardly extending, central rib 118 for a purpose hereinafter described.

The central wedge block B is in the form of a hollow casting and has front and rear sets of wedge faces, the front set being designated by 18—18 and the rear set by 19—19. The wedge faces 19 are disposed at a relatively keen angle with respect to the longitudinal axis of the mechanism and the wedge faces 18 at a relatively blunt angle to said axis, the inclination of the faces 19 preferably corresponding to the inclination of the faces 16 of the rear follower block A and the inclination of the faces 18 preferably corresponding to the inclination of the faces 17 of the front follower block A.

The central wedge block B has a pair of ribs 20. One of the ribs 20 is disposed at the front end of the block and in alinement with the rib 118 of the front follower block A and the other rib 20 is disposed at the rear end of the block and is in alinement with the rib 118 of the rear follower block A. As clearly shown in Figure 1, the ribs 118 and 20 are slotted to accommodate the corresponding retainer bolt E and at the same time permit a certain amount of relative movement of the follower blocks A and the central wedge block B. The ribs 20 of the follower blocks A and the central wedge block B are of such a length as to permit a predetermined amount of relative movement between these parts and then arrest further movement of the same. The side members are four in number and are arranged in sets as the front and rear end of the mechanism, one set C—C co-operating with the front follower A and the central wedge block B, and the other set D—D co-operating with the rear follower A and the central wedge block. The front set of side members C—C are of similar design and each is provided with a pair of wedge faces 117—118 on the inner side thereof, co-operating respectively with the wedge faces 17 and 18 of the front follower A and wedge block B at the same side of the mechanism and correspondingly inclined thereto. Each of the blocks D of the rear set is provided with a pair of wedge faces 116 and 119 co-operating with the wedge faces 16 and 19 of the rear follower A and the central wedge block at the same side of the mechanism and correspondingly inclined thereto. Each of the side members C and D is provided with a bore 21 adapted to loosely accommodate the corresponding retainer bolt E. The bores 21 of the side members of each set are in transverse alinement as most clearly shown in Figure 1 to receive the corresponding retainer bolt E.

Relative separation of the side member of each pair is opposed by the spring resistance elements F which are disposed on the outer sides of the draft sills and interposed between collars 22 fixed to the outer ends of the bolts and spring followers G bearing directly on the side members. The spring followers G are provided with inner cylindrical sections 23, slidingly accommodated within the elongated openings 24 provided in the draft sills 10. Each of the collars G has an annular flange 25 on which the inner end of the corresponding spring resistance element bears. Each of the spring followers is also provided with a cylindrical section projecting outwardly beyond the flange 25 and extending into the inner coil of the corresponding spring resistance element F. The slots 24 in the draft sills are of such a length as to permit free movement longitudinally of the mechanism of the spring followers G during the entire operation of the gear.

I preferably employ a pair of retainer bolts 26 to limit the longitudinal separation of the front follower block A and the central wedge block C when the mechanism is in full release. The retainer bolts 26 are disposed at opposite sides of the mechanism, the shank of each bolt being accommodated in alined openings in the front follower block A and a central wedge block B. The heads of the retainer bolts 26 are accommodated within the hollow follower blocks A and the nuts of the bolts are accommodated within the hollow portion of the central wedge block. In assembling the mechanism, the bolts 26 are entered through openings 27 provided in the front end wall of the front follower block A. The bolts 26 are adjusted to such a length as to provide the proper clearance between the inner end of the front follower A and the front end of the central wedge block B. It will be evident that by providing the retainer bolts for limiting the longitudinal separation of the front follower A and the central wedge block B, the proper sequence of operation of the wedge blocks C and D is assured and compensation for wear of the various friction surfaces is taken care of.

The operation of my improved shock absorbing mechanism, during a compression stroke is as follows: The follower blocks A will be moved inwardly toward each other and the co-operating keen wedge faces of the side members D, the rear follower A and the central wedge block B will first become operative thereby effecting separation of the side member D resisted by the springs F. This action will continue until the lugs 118 and 20 of the rear follower block A and the central wedge block B come into abutment, whereupon relative movement of the front follower A and the central wedge block B will be effected. Upon relative approach of the front follower A and the central wedge block B, the side member C will be forced outwardly against the resistance of the springs F and due to the blunt angle of the co-operating wedge faces of these side members and the front follower and central wedge block, the frictional resistance offered will be greatly augmented. It will be evident that two stages of frictional resistance are thus had, the second stage being greater than the first. The described action will continue until the ribs 20 of the front follower A and the central wedge block come into engagement, whereupon further compression of the mechanism will be limited and the actuating force transmitted through the followers A and the central friction block B to the stop lugs on the draft sills, the members A—A and B acting as a solid column to transmit the load directly to the draft sills.

Upon reduction of the actuating force, the spring resistance elements F will force the side members C and D inwardly, thereby restoring all of the parts of the mechanism to the normal full release position illustrated in Figure 1. Due to the wedge faces of the blocks C being disposed at a keener angle with reference to the laterally acting forces than the wedge blocks D, there will be a tendency for the former to advance with reference to the latter. Lateral inward movement of the wedge blocks C will be positively arrested upon the limit of longitudinal separation of the front follower block A and the central wedge block B being reached. As hereinbefore pointed out, longitudinal separation of the front follower block A and the central wedge block B is limited by the retainer bolts 26. Due to the lateral inward movement of the block C being positively limited, the wedge blocks D will be properly positioned when the mechanism is in full release as clearly illustrated in Figure 1.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with end followers movable relatively to each other; of a floating central member; front and rear sets of side members, one of said sets having wedge faces disposed at a relatively blunt angle with respect to the longitudinal axis of the mechanism, said wedge faces co-operating with similar wedge faces on the central member and the follower at the corresponding end of the mechanism and the other set having wedge faces disposed at a relatively keen angle to said axis, the keen faces co-operating with similar wedge faces on the central member and the other main follower; and yielding means opposing lateral separation of each set of side members.

2. In a friction shock absorbing mechanism, the combination with end followers movable relatively toward each other; of a central wedge member; front and rear sets of side members, one of said sets having wedge faces disposed at a blunt angle with respect to the direction of the actuating force and co-operating with similar wedge faces on the central member and the follower at the corresponding end of the mechanism and the other set having wedge faces disposed at a keen angle to the direction of said actuating force, said keen faces co-operating with similar wedge faces on the central member and the other main follower; yielding means opposing lateral separation of said side members; and co-operating means on said front and rear followers and central member to limit the relative approach thereof.

3. In a friction shock absorbing mechanism, the combination with end followers relatively movable toward and away from each other; a central wedge member; front and rear sets of side members each side member having wedge faces co-operating respectively with one of said followers and the central wedge member, the wedge faces of one of said followers and the wedge faces of the central wedge member at the same end of the mechanism being disposed at a keener angle with respect to the longitudinal axis of the mechanism than the remaining wedge faces, said follower having the keener wedge faces and said central wedge member having co-operating means thereon for limiting the relative movement thereof to effect operation of the remaining side members after a predetermined compression of the mechanism to provide for successive stages of increasing frictional resistance.

4. In a railway draft rigging, the combination with draft sills having front and rear stop lugs thereon; of a friction shock absorbing mechanism disposed between said draft sills, said mechanism including: a front and a rear follower relatively movable toward each other, a central wedge member, front and rear sets of side members, said side members having wedge faces co-operating with the front and rear followers and central wedge member, the wedge faces of one of said sets of side members being disposed at a keener angle with respect to the longitudinal axis of the mechanism than the other set of side members; transversely arranged retainer bolts extending through said sets of side members; stop means at the opposite ends of said bolts and spring resistance elements interposed between each stop means of each bolt and the corresponding side member at the same side of the mechanism.

In witness that I claim the foregoing I have hereunto subscribed my name this 30th day of June 1926.

JOHN F. O'CONNOR.